(12) United States Patent
Sinha et al.

(10) Patent No.: US 7,746,810 B2
(45) Date of Patent: Jun. 29, 2010

(54) WAKE ON WIRELESS NETWORK TECHNIQUES

(75) Inventors: Shailendra Sinha, Hillsboro, OR (US); Myron Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 11/394,924

(22) Filed: Mar. 31, 2006

(65) Prior Publication Data

US 2007/0230393 A1    Oct. 4, 2007

(51) Int. Cl.
*H04B 7/005* (2006.01)

(52) U.S. Cl. .......................... 370/278; 455/92; 455/69; 455/411; 455/574; 455/343.1

(58) Field of Classification Search .................. 370/338; 455/522
See application file for complete search history.

(56) References Cited

U.S. PATENT DOCUMENTS

| 2004/0135725 A1* | 7/2004 | Akita ........................... 342/457 |
| 2006/0028986 A1* | 2/2006 | Kwon et al. ................. 370/230 |
| 2006/0252435 A1* | 11/2006 | Henderson et al. .......... 455/466 |
| 2006/0281436 A1* | 12/2006 | Kim et al. ................. 455/343.2 |

* cited by examiner

*Primary Examiner*—Rafael Pérez-Gutiérrez
*Assistant Examiner*—Marcos Batista
(74) *Attorney, Agent, or Firm*—Kacvinsky LLC

(57) ABSTRACT

Wake on wireless network techniques are described. An apparatus may include a wireless transceiver, a processor coupled to said transceiver, and a connection management module for execution by the processor. The connection management module may establish a connection with a client device, receive a sleep preparation message with at least one sleep parameter value from the client device, and set a timeout value for the connection based on the sleep parameter value. Other embodiments are described and claimed.

13 Claims, 3 Drawing Sheets

WAKE ON WIRELESS NETWORK TECHNIQUES

BACKGROUND

A wireless device typically has one or more power saving modes to conserve energy when the wireless device is not in use. This may be particularly important when a wireless device uses a mobile power source such as a battery. One power saving mode is sometimes referred to as a sleep mode. In some cases, it may be desirable to remotely wake up a wireless device from sleep mode using wireless signals. Such remote operations are sometimes referred to as "wake on wireless" network techniques. When a wireless mobile device is connected to a network, however, entering sleep mode may result in the wireless device losing connectivity with the network. This may cause disruptions in network services to the wireless device (e.g., call notification), as well as the need to reestablish the network connection when it finally exits sleep mode. Accordingly, there may be a need for improved techniques to solve these and other problems.

DETAILED DESCRIPTION

Various embodiments may be generally directed to wireless networking techniques. Some embodiments may be directed to wake on wireless network (WoW) techniques. More particularly, some embodiments may provide for wireless access point (AP) enablement for WoW techniques. For a client device to remain authenticated and associated with an AP, the AP may need to periodically refresh its cryptographic keys using a default timeout period. Some embodiments allow negotiation of the timeout period, so that the client device can still remain available on a secure wireless network without transmitting any data. This allows features like WoW to function. The client device and AP may collaborate to enable an end-to-end WoW solution.

In one embodiment, for example, a wireless AP may comprise a wireless transceiver, a processor, and a connection management module for execution by the processor. The AP may use the connection management module to establish a connection with a client device. The AP may receive a sleep preparation message with at least one sleep parameter value from the client device. For example, the sleep parameter value may represent an amount of time the client device will remain in a power saving mode, such as a sleep mode or other modes. The AP may set a timeout value for the connection, or various aspects of the connection, based on the sleep parameter value. In this manner, the AP will not prematurely timeout the connection with the client device while in sleep mode. This may allow the client device to continue to access network services while in sleep mode, and reduce or avoid the operations needed to reestablish connectivity with the AP after switching from sleep mode to an operational mode. As a result, a user may realize enhanced products or services. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
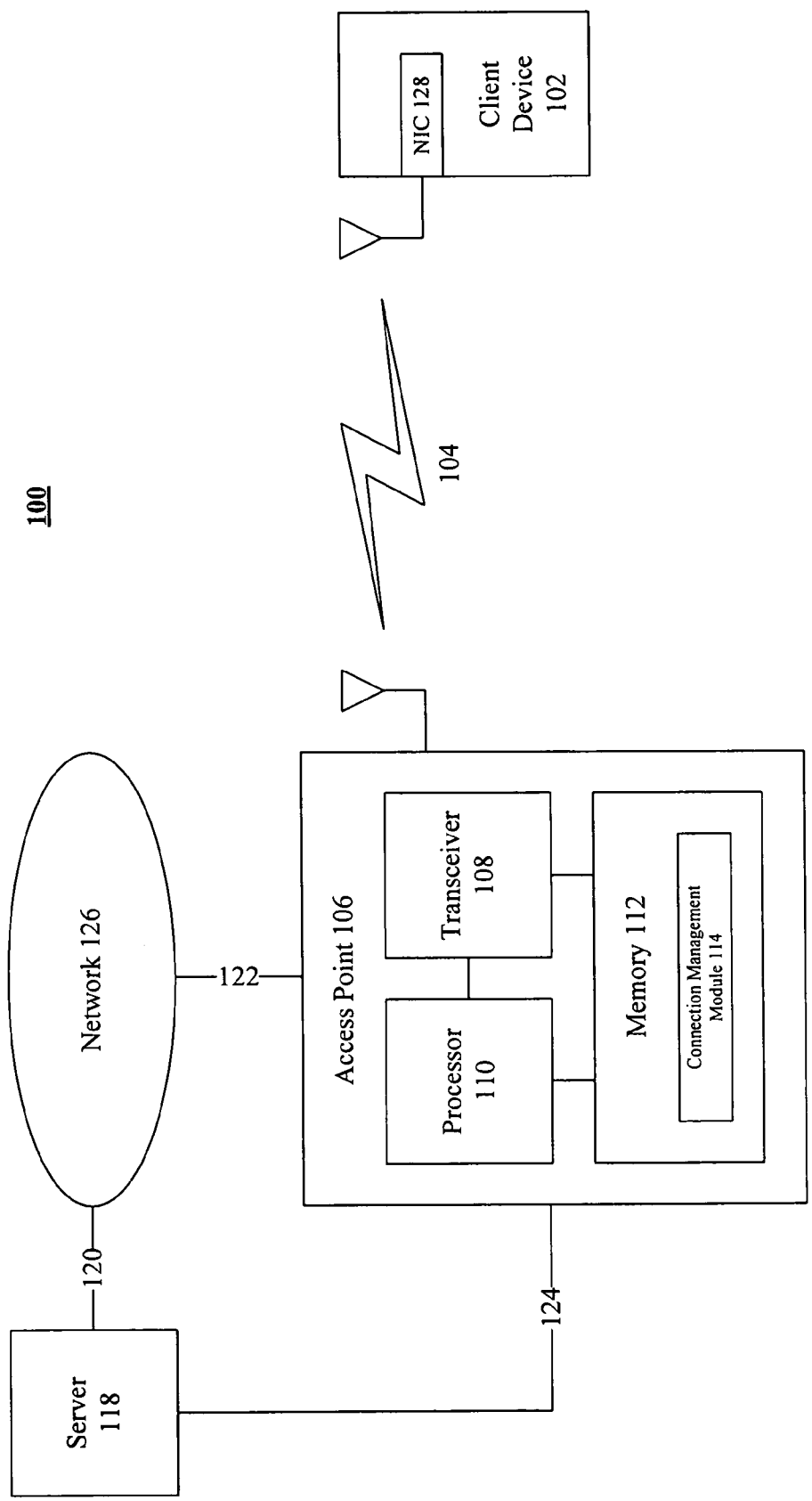
FIG. 1 illustrates one embodiment of a system.

FIG. 1 illustrates one embodiment of a communications system. FIG. 1 illustrates a block diagram of a communications system 100. As shown in FIG. 1, communication system 100 comprises multiple elements, such as a client device 102, access point 106, server 118, and network 126. It is worthy to note that although elements 102, 118 are described by way of example using client-server nomenclature, it may be appreciated that elements 102, 118 may also have other relationships such as peer-to-peer or ad hoc networking using the Independent Basic Service Set (IBSS), and still fall within the intended scope of the embodiments. Furthermore, the embodiments are not limited to the elements shown in FIG. 1.

In various embodiments, communications system 100 may include client device 102. Client device 102 may comprise any electronic device having wireless capabilities. In some embodiments, client device may comprise a mobile wireless device using a battery as a power source. Examples of client device 102 may include a processing system, a computer, a computer system, a computer sub-system, an appliance, a network application, a workstation, a terminal, a server, a personal computer (PC), a desktop computer, a laptop computer, an ultra-laptop computer, a notebook computer, a handheld computer, a personal digital assistant (PDA), a telephone, a mobile telephone, a cellular telephone, a handset, a smart phone, a pager, a one-way pager, a two-way pager, a digital camera, a digital video recorder, a digital video player, a digital audio recorder, a digital audio player, a set top box (STB), a media server, and so forth. In one embodiment, for purposes of example, client device 102 may comprise a laptop with a wireless network interface card (NIC) 128. The embodiments, however, are not limited to this example.

In various embodiments, client device 102 may operate in various operating modes or states, including one or more power saving modes, collectively referred to herein as a "sleep mode." For example, client device 102 may operate using the power saving modes as defined by the Advanced Configuration and Power Interface (ACPI) Specification. The ACPI Specification defines power saving modes S0-S5, where S0 sleep mode is when a device is fully operational, S1 sleep mode is when the system appears off and the processor is off but memory is refreshed, S2 sleep mode is the same as S1 with lower power consumption, S3 sleep mode is the same as S2 but with slower memory refresh, S4 sleep mode is the same as S3 with no memory refresh, and S5 is completely off and requires a reboot to start up again. Client device 102 may also support the Peripheral Component Interface (PCI) Power Management (PM) Specification, that defines four power saving modes D0-D4 which provide more aggressive power savings as the mode number increases. Other power saving modes may be implemented for client device 102 as desired for a given implementation.

In various embodiments, communications system 100 may include AP 106. AP 106 may comprise a wireless access point. In computer networking, AP 106 is a device that connects wireless communication devices together to form a wireless network. Examples of wireless networks may include wireless local area networks (WLAN), wireless metropolitan area network (WMAN), wireless wide area networks (WWAN), wireless personal area networks (WPAN), wireless storage area networks (WSAN), and so forth. AP 106 can relay data or information between wireless devices and wired devices. Several access points can link together to form a larger network that allows "roaming". As with client device 102 and other network devices, AP 106 has its own Internet Protocol (IP) address and media access control (MAC) address for unique identification of access point 106 by the network.

In various embodiments, client device 102 and AP 106 may communicate information over one or more types of wireless communication media, such as wireless shared media 104. An example of a wireless communication media may include portions of a wireless spectrum, such as one or more bands or sub-bands of radio-frequency (RF) spectrum. Client device 102 and AP 106 may each include components and interfaces suitable for communicating information signals over the designated wireless spectrum, such as one or more antennas, wireless transceivers or radios, amplifiers, filters, control logic, and so forth. Examples of an antenna include an internal antenna, an omni-directional antenna, a monopole antenna, a dipole antenna, an end fed antenna, a circularly polarized antenna, a micro-strip antenna, a diversity antenna, a dual antenna, a tri-band antenna, a quad-band antenna, and so forth. The embodiments are not limited in this context.

In various embodiments, client device 102 and AP 106 may communicate information over wireless shared media 104 using one or more communication protocols. Examples of communication protocols include standards and draft standards promulgated by the Institute of Electrical and Electronics Engineers (IEEE), the Internet Engineering Task Force (IETF), the International Telecommunications Union (ITU), and so forth. In various embodiments, for example, communications system 100 may communicate information according to one or more IEEE 802 standards including IEEE 802.11x standards (e.g., 802.11a, b, g/h, j, n, and variants), 802.16x standards (e.g., 802.16-2004, 802.16.2-2004, 802.16e, 802.16f, and variants), 802.20 standards and variants, and so forth. The embodiments are not limited in this context.

In various embodiments, AP 106 may connect to network 126. Network 126 may comprise any type of wired or wireless network arranged to communicate information between the various elements of communications system 100. Network 126 may communicate information in accordance with any number of different data communication protocols, such as a medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), Hypertext Markup Language (HTML) protocol, Extensible Markup Language (XML) protocols, User Datagram Protocol (UDP), and so forth. In one embodiment, for example, network 126 may comprise a network using one or more IP communication protocols, such as the Internet or World Wide Web (WWW), for example. Each of these protocols may be used when communicating data between AP 106 and client device 102 as well. The embodiments, however, are not limited in this context.

In various embodiments, communications system 100 may include server 118. Server 118 may communicate with AP 106 over network 126 via communication lines 120, 122, or alternatively, directly via communication line 124. Server 118 may communicate with client device 102 via AP 106. Server 118 may comprise a processor-based computing device such as any of those previously described with reference to client device 102, as well as others. Server 118 may perform various network operations for system 100, including authentication operations, WoW operations, data delivery operations, and so forth. Although some embodiments may describe server 118 as one example of a device to wake up client device 102 to implement various WoW techniques, other devices may also be used to wake up client device 102. For example, any of the devices described by way of example for client device 102 may be arranged to wake up client device 102 as desired for a given implementation.

In various embodiments, client device 102 and server 118 may be arranged to implement various WoW techniques. In accordance with WoW techniques, client device 102 may go into one or more power saving modes (e.g., sleep modes S0-S5 and/or D0-D4) in order to conserve power. Client device 102 may be remotely awakened by another device, such as AP 106 and/or server 118, as well as others. This may be accomplished by having client device 102 store certain client pattern information in NIC 128. Client pattern information may refer to predefined digital data frame patterns. The client pattern information may be set using standard Object Identifiers (OID) as defined by Microsoft® Corporation, for example. When client device 102 enters a sleep mode (e.g., S3 system and/or D3 NIC), NIC 128 continues to receive packets from server 118. Some packets may include server pattern information in the form of sequential bytes within the received packets. The server pattern information may comprise the same or similar digital data frame patterns corresponding to the client pattern information stored by NIC 128. NIC 128 retrieves sequential bytes from received packets, and performs pattern matching operations in an attempt to match the server pattern information received from server 118 with the client pattern information stored by NIC 128. If a pattern match is found, NIC 128 sends a wake up command to client device 102 to cause client device 102 to switch from a sleep mode to an operational mode.

Prior to communicating information between client device 102 and AP 106 over wireless shared media 104, client device 102 needs to establish an association or connection (collectively referred to as a "connection" or variants) with AP 106. In one embodiment, for example, client device 102 and AP 106 may be implemented in accordance with the IEEE 802.11x series of standards or variants. In accordance with IEEE 802.11x, client device 102 and AP 106 may perform various connection operations to form a connection between client device 102 and AP 106. The connection operations may include, but are not necessarily limited to, discovery operations to discover each device, authentication operations to confirm the identity of client device 102, configuration operations to exchange capabilities information (e.g., connection speeds, hardware configurations, software configurations, network addresses), and so forth. Once a connection has been established between client device 102 and AP 106, the devices may communicate information between each other over wireless shared media 104.

Once a connection has been established between client device 102 and AP 106, AP 106 may maintain a timeout value for the connection. The timeout value may represent a time period. If AP 106 does not receive any information from client device 102 within the time period defined by the timeout value, AP 106 may disconnect, de-associate, or otherwise drop the connection with client device 102. If this occurs, client device 102 may need to once again repeat the connection operations with AP 106 in order to reestablish a connection.

In some cases, the connection operations may include authentication operations. Authentication operations may be used to authenticate client device 102 in order for client device 102 and AP 106 to perform secure communications in accordance with an implemented standard. Because wireless communications can be intercepted to collect sensitive information, various techniques have been developed to encrypt data, authenticate clients, and authenticate the network. Consequently, client device 102 and AP 106 may perform cryptographic operations in accordance with any number of suitable cryptographic schemes, operations, or techniques, such as the Wired Equivalence Privacy (WEP) protocol, WiFi Protected Access (WPA) protocol, WPA with Temporal Key Integrity Protocol (TKIP) support, WPA with Extensible Authentication Protocol (EAP) support, WPA Second Generation (WPA2), Wireless LAN Authentication and Privacy Infrastructure (WAPI) protocol, Advanced Encryption Scheme (AES) protocol, Secure Socket Layer (SSL) protocol, Transport Layer Security (TLS), Secure Shell (SSH), IP Security (IPSec) protocols, Domain Name System Security Extensions (DNSSEC), Public Key Infrastructure (PKI) protocol, Data Encryption Standard (DES) protocols, Virtual Private Network (VPN) protocols, Counter Mode with Cipher Block Chaining Protocol (CCMP), and so forth. Once authentication operations have been completed, a trusted pair or trusted relationship may be established between AP 106 and client device 102, thereby obviating the need to perform authentication operations for future communications between the two devices.

Sometime during or after authentication operations, AP 106 may assign a cryptographic key to client device 102 for use in encrypting and decrypting communications between AP 106 and client device 102. In order to prevent the cryptographic key from being compromised, one or more cryptographic key management techniques may be employed. Cryptographic key management is typically performed by a ring 3 component referred to as a supplicant. For some cryptographic schemes, a supplicant for AP 106 may use a cryptographic key timeout value to determine a timeout period for a given cryptographic key. This occurs, for example, when using WPA2 cryptographic schemes such as TKIP and CCMP. When the timeout period expires, AP 106 may assign a new cryptographic key to client device 102. In this manner unauthorized interceptions may be reduced or avoided by constantly changing and refreshing the cryptographic keys.

The security and connection aspects of maintaining the communication link between AP 106 and client device 102 may interfere with the WoW techniques implemented between server 118 and client device 102. More particularly, client device 102 may potentially lose connectivity to AP 106 when client device 102 enters sleep mode. For example, if client device 102 enters sleep mode for a time period that exceeds a timeout value associated with the connection between client device 102 and AP 106, AP 106 may drop the connection with client device 102. If this occurs, server 118 will be unable to remotely awaken client device 102. In another example, if client device enters sleep mode for a time period that exceeds the cryptographic key timeout value associated with the connection between client device 102 and AP 106, AP 106 may change or refresh the cryptographic key assigned to client device 102 while client device 102 remains in sleep mode. Since client device 102 cannot receive and store the new cryptographic key while in sleep mode, server 118 may be unable to remotely awaken client device 102. Furthermore, even if client device 102 switches between sleep mode and an operational mode while the connection between client device 102 and AP 106 remains active, client device 102 will not have the appropriate cryptographic key to communicate with AP 106. Examples of client device 102 switching between sleep mode and an operational mode without server 118 may include a response to local user commands (e.g., via keyboard, mouse, or some other human interface device), setting a sleep mode time period that is less than the timeout value of AP 106, and so forth. In all cases, loss of connectivity may disrupt the delivery of network services to client device 102. An example of a loss of network service may be failure to receive a call notification for a voice over packet (VOP) peer-to-peer application. In addition to loss of network services, client device may need to repeat connection operations again in order to reestablish a connection with AP 106 when client device 102 finally exits sleep mode, thereby wasting valuable user time and system resources.

To solve these and other problems, client device 102 may be arranged to inform AP 106 of a time period for its sleep mode. In this manner, AP 106 may modify the appropriate timeout values so that client device 102 and AP 106 may continue to maintain a persistent connection even when client device 102 enters sleep mode. As a result, server 118 may be able to wake up client device 102 using various WoW techniques over the persistent connection.

In one embodiment, for example, AP 106 may include a transceiver 108, a processor 110, and a memory 112. Memory 112 may include a connection management module 114. Connection management module 114 may be software arranged to manage or control various connections between AP 106 and other wireless devices, such as client device 102. Examples of processors may include a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 110 may be implemented as a general purpose processor or dedicated processor. Examples of dedicated processors may include a controller, microcontroller, embedded processor, a digital signal processor (DSP), a network processor, a media processor, an input/output (I/O) processor, and so forth. Memory 112 may include any machine-readable or computer-readable media capable of storing data, including both volatile and non-volatile memory. Examples for memory 112 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 112 may be included on the same integrated circuit as processor 110, or alternatively some portion or all of memory 112 may be disposed on an integrated circuit or other medium, for example a hard disk drive, that is external to the integrated circuit of processor 110. The embodiments are not limited in this context.

It may be appreciated that although some embodiments may describe connection management module 114 as software executed by processor 110, it may be appreciated that connection management module 114 may be implemented using hardware, software, or a combination thereof, and still fall within the scope of the embodiments. The embodiments are not limited in this context.

In general operation, processor 110 may execute connection management module 114 to establish a connection between AP 106 and client device 102. AP 106 may receive a sleep preparation message with at least one sleep parameter value from client device 102. The sleep parameter value may comprise, for example, a time period representing how long client device 102 will remain in sleep mode. AP 106 may set a timeout value for the connection based on the sleep parameter value. In this manner, the wireless access point may be made aware of an amount of time the client device intends to remain in sleep mode, and adjust the timeout period accordingly in an effort to maintain a persistent connection with the client device for the duration of the sleep mode. Operations for communication system 100 may be further described with reference to FIG. 2.

Figure 2:
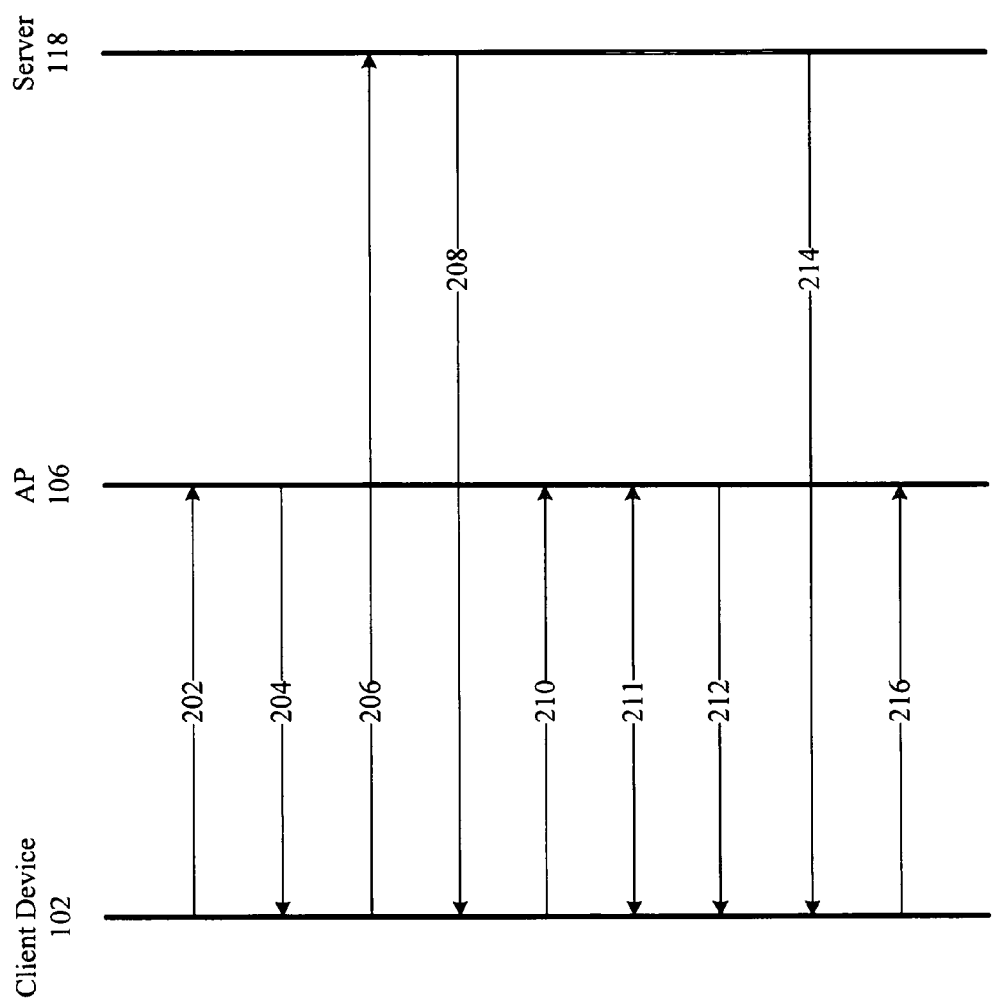
FIG. 2 illustrates one embodiment of a message flow.

FIG. 2 illustrates one embodiment of a message flow. FIG. 2 illustrates a representative message flow 200 between client device 102, AP 106, and server 118. As shown in message flow 200, client device 102 may acquire signal from AP 106 and initiate connection operations to establish a connection or association between client device 102 and AP 106 as indicated by arrow 202. AP 106 may authenticate client device 102, and subsequent to authentication send a cryptographic key to client device 102 at arrow 204. Client device 102 may register with server 118 for WoW operation at arrow 206. Server 118 may send client pattern information to client device 102 at arrow 208. Client device 102 may store the client pattern information using NIC 128 or memory 112, for example. Server 118 may wake up client device 102 by sending server pattern information to client device 102 over the connection formed between AP 106 and client device 102.

At some point during operations, client device 102 may intend to enter sleep mode in order to conserver power. This may occur, for example, if client device 102 has not received any user inputs for a certain period of time. Prior to entering sleep mode, client device 102 may send a sleep preparation message to AP 106 at arrow 210. The sleep preparation message may include a sleep parameter value. In addition, the sleep preparation message may also include capabilities information for client device 102. The capabilities information may indicate, for example, that client device 102 utilizes WoW services from server 118.

Upon receiving the sleep preparation message, AP 106 may retrieve the sleep parameter value and capabilities information from the sleep preparation message. AP 106 may recognize from the capabilities information that client device 102 is capable of entering a sleep mode, and further, that server 118 may send a wake up command (e.g., deterministic or non-deterministic) to client device 102 in order to switch client device 102 from the sleep mode to an operational mode. AP 106 may maintain a timeout value for the connection that is set to timeout and drop the connection if a signal is not received from client device 102 within a predefined time. AP 106 may set or modify the timeout value for the connection based on the sleep parameter value retrieved from the sleep preparation message.

To ensure that AP 106 does not drop the connection while client device 102 is in sleep mode, AP 106 may modify or set the timeout value to a value that is greater than the sleep parameter value retrieved from the sleep preparation message. For example, if the typical timeout period for a connection is 20 minutes, and client device 102 is switching to sleep mode for 25 minutes, AP 106 may modify or set the timeout value to some value greater than 25 minutes (e.g., 27 minutes). The additional amount by which AP 106 modifies the original timeout value may vary according to a given implementation, but is typically a time interval sufficient to allow client device 102 to wake up and send a signal to AP 106 in order to maintain the established connection between client device 102 and AP 106. Once AP 106 receives the signal from client device 102, AP 106 may reset the timeout value and associated timers for the connection.

In some cases, client device 102 and AP 106 may establish a secure connection using a cryptographic key assigned to client device 102. AP 106 may periodically change or refresh the cryptographic key assigned to client device 102. This may occur by AP 106 sending the new cryptographic key to client device 102, and client device 102 storing the cryptographic key in NIC 128 and/or memory 112. When in sleep mode, however, client device 102 may be incapable of receiving and storing the new cryptographic key, thereby rendering client device 102 incapable of communicating with AP 106 when exiting sleep mode. AP 106 may therefore modify or set a cryptographic key timeout value for the connection (or client device 102) to a value that is greater than the sleep parameter value retrieved from the sleep preparation message. For example, if the typical cryptographic key timeout period for a secure connection is 20 minutes, and client device 102 is switching to sleep mode for 25 minutes, AP 106 may modify or set the cryptographic key timeout value to 27 minutes. This may give client device 102 sufficient time to wake up and receive the new cryptographic key from AP 106 in order to maintain the established secure connection between client device 102 and AP 106. Once AP 106 receives a signal from client device 102 using the new cryptographic key, AP 106 may reset the cryptographic key timeout value and associated timers for the secure connection.

In some cases, client device 102 and AP 106 may negotiate on a time out period that is suitable for both devices as indicated by arrow 211. For example, if client device 102 sends a sleep preparation message with a sleep parameter value of 25 minutes, but AP 106 prefers a cryptographic key timeout value of 20 minutes for security reasons, AP 106 may send a modified acknowledgement message suggesting an alternative sleep parameter value it is willing to accept. In this manner, client device 102 may consider limiting the duration of its sleep mode to the sleep parameter value suggested by AP 106. For another example, client device 102 and AP 106 may continue negotiations until resolving to a mutually agreeable time period for the timeout value and sleep mode. In yet another example, AP 106 may suspend all timeout operations for the connection with client device 102 until notified otherwise by client device 102 and/or server 118.

After client device 102 sends the sleep preparation message to AP 106, AP 106 may send an acknowledgement message to client device 102 at arrow 212. Once AP 106 receives the acknowledgement message, client device 102 may switch to sleep mode. While in sleep mode, server 118 may send a wake up command in the form of one or more packets with server pattern information to client device 102 at arrow 214. NIC 128 of client device 102 may perform pattern matching operations by comparing the server pattern information with the client pattern information stored by NIC 128. If a pattern match occurs, NIC 128 may send a wake up command signal to client device 102. Client device 102 may switch from a sleep mode to an operational mode in response to the wake up command signal. The operational mode may be one of many operational modes using varying power levels, as long as the power level of the operational mode is higher than the power level used by client device 102 during sleep mode. After switching to an operational mode, client device 102 may begin communicating information with AP 106 over the established and persistent connection at arrow 216.

Communications between client device 102 and AP 106 of the various messages described with reference to message flow 200 may be accomplished using any desired communications protocol and data structure capable of conveying the appropriate parameters and values. A new protocol may be defined or an existing protocol modified to convey the desired parameters and values. In one embodiment, for example, client device 102 and AP 106 may communicate the sleep preparation and/or acknowledgement messages using a protocol such as Universal Plug and Play (UPnP), and others as well.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a connection management module, or any combination thereof. The embodiments are not limited in this context.

Figure 3:
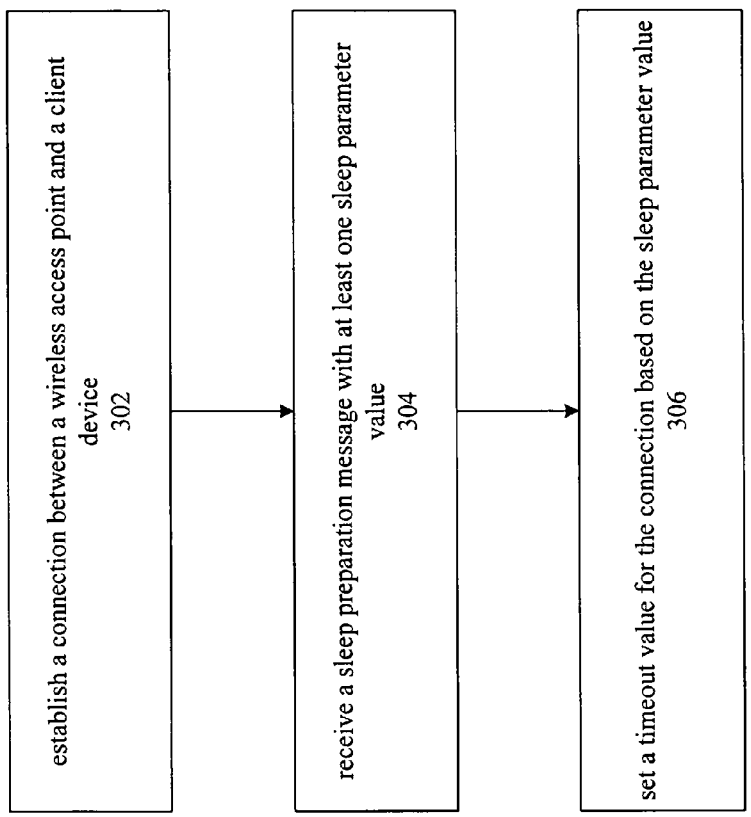
FIG. 3 illustrates one embodiment of a logic diagram.

FIG. 3 illustrates one embodiment of a logic flow. FIG. 3 illustrates a logic flow 300. Logic flow 300 may be representative of the operations executed by one or more embodiments described herein. As shown in logic flow 300, a connection between a wireless access point and a client device may be established at block 302. A sleep preparation message with at least one sleep parameter value may be received at block 304. The sleep preparation message may also have a capabilities parameter value to represent whether the client device may be remotely switched from the sleep mode to an operational mode using a wake up command. A timeout value for the connection may be set based on the sleep parameter value at block 306. In one embodiment, for example, the timeout value may be set to a value greater than the sleep parameter value. The embodiments are not limited in this context.

In one embodiment, a cryptographic key may be sent to the client device. A key timeout value may be set for the cryptographic key based on the sleep parameter value. The embodiments are not limited in this context.

In one embodiment, the client device may send the sleep preparation message with the sleep parameter value and/or capabilities parameter value. The client device may switch from an operational mode to a sleep mode. The client device may switch from the sleep mode to operational mode once the sleep parameter value expires. The client device may send information to the access point over the connection after exiting sleep mode. If the client device does not switch from the sleep mode to operational mode once the sleep parameter value expires, the access point may disassociate with the client device. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal connection management modules (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, connection management module, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
    a wireless transceiver;
    a processor coupled to said transceiver; and
    a connection management module for execution by said processor, said connection management module to establish a connection with a client device, receive a sleep preparation message with at least one sleep parameter value from said client device, said sleep preparation message having a capabilities parameter value to represent whether said client device may be remotely switched from said sleep mode to an operational mode using a wake up command or whether said client device includes a sleep mode that cannot be switched to an operational mode, set a timeout value for said connection based on said sleep parameter value, send a cryptographic key to said client device and set a key timeout value for said cryptographic key based on said sleep parameter value to allow the client device to be in the operational mode prior to receiving a new cryptographic key.

2. The apparatus of claim 1, said connection management module to set said timeout value to a value greater than said sleep parameter value.

3. The apparatus of claim 1, said connection management module to send a beacon message to said client device using said transceiver, said beacon message to indicate to said client device to initiate pattern matching operations.

4. A system, comprising:
    a wireless access point, comprising:
        a wireless transceiver;
        a processor coupled to said transceiver; and
        a connection management module for execution by said processor, said connection management module to establish a connection with a client device, receive a sleep preparation message with at least one sleep parameter value from said client device, said sleep preparation message having a capabilities parameter value to represent whether said client device may be remotely switched from said sleep mode to an operational mode using a wake up command or whether said client device includes a sleep mode that cannot be switched to an operational mode, set a timeout value for said connection based on said sleep parameter value, send a cryptographic key to said client device, and set a key timeout value for said cryptographic key based on said sleep parameter value to allow the client device to be in the operational mode prior to receiving a new cryptographic key.

5. The system of claim 4, said wireless access point to receive a secure communication from said client device after receiving said sleep preparation message and prior to expiration of said timeout value.

6. The system of claim 4, said connection management module to set said timeout value to a value greater than said sleep parameter value.

7. A method, comprising:
    establishing a connection between a wireless access point and a client device;
    receiving a sleep preparation message with at least one sleep parameter value, said sleep preparation message having a capabilities parameter value to represent whether said client device may be remotely switched from said sleep mode to an operational mode using a wake up command or whether said client device includes a sleep mode that cannot be switched to an operational mode;
    setting a timeout value for said connection based on said sleep parameter value,
    sending a cryptographic key to said client device; and
    setting a key timeout value for said cryptographic key based on said sleep parameter value to allow the client device to be in the operational mode prior to receiving a new cryptographic key.

8. The method of claim 7, comprising setting said timeout value to a value greater than said sleep parameter value.

9. The method of claim 7, comprising:
    sending said sleep preparation message with said sleep parameter value;
    switching to a sleep mode;
    switching to an operational mode after said sleep parameter value expires; and
    sending information to said access point over said connection.

10. An article comprising a machine-readable storage medium containing instructions that if executed enable a system to establish a connection between a wireless access point and a client device, receive a sleep preparation message with at least one sleep parameter value, said sleep preparation message having a capabilities parameter value to represent whether said client device may be remotely switched from said sleep mode to an operational mode using a wake up command or whether said client device includes a sleep mode that cannot be switched to an operational mode, set a timeout value for said connection based on said sleep parameter value, send a cryptographic key to said client device, and set a key timeout value for said cryptographic key based on said sleep parameter value to allow the client device to be in the operational mode prior to receiving a new cryptographic key.

11. The article of claim 10, further comprising instructions that if executed enable the system to set said timeout value to a value greater than said sleep parameter value.

12. The article of claim 10, further comprising instructions that if executed enable the system to send said sleep preparation message with said sleep parameter value, switch to a sleep mode, switch to an operational mode after said sleep parameter value expires, and send information to said access point over said connection.

13. The article of claim 10, further comprising instructions that if executed enable the system to send a beacon message to said client device to initiate pattern matching operation.

* * * * *